Sept. 19, 1933.  B. G. FREUND ET AL  1,927,396

DEHYDRATING APPARATUS

Filed March 16, 1932  2 Sheets-Sheet 1

INVENTORS
Berthold G. Freund
Charles W. Thomas
BY
ATTORNEY

Sept. 19, 1933.   B. G. FREUND ET AL   1,927,396
DEHYDRATING APPARATUS
Filed March 16, 1932   2 Sheets-Sheet 2
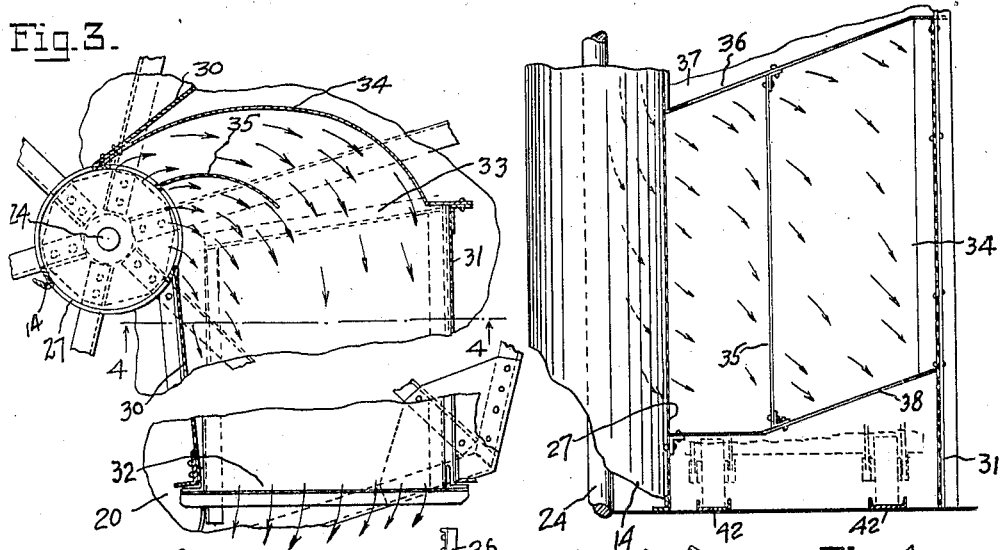
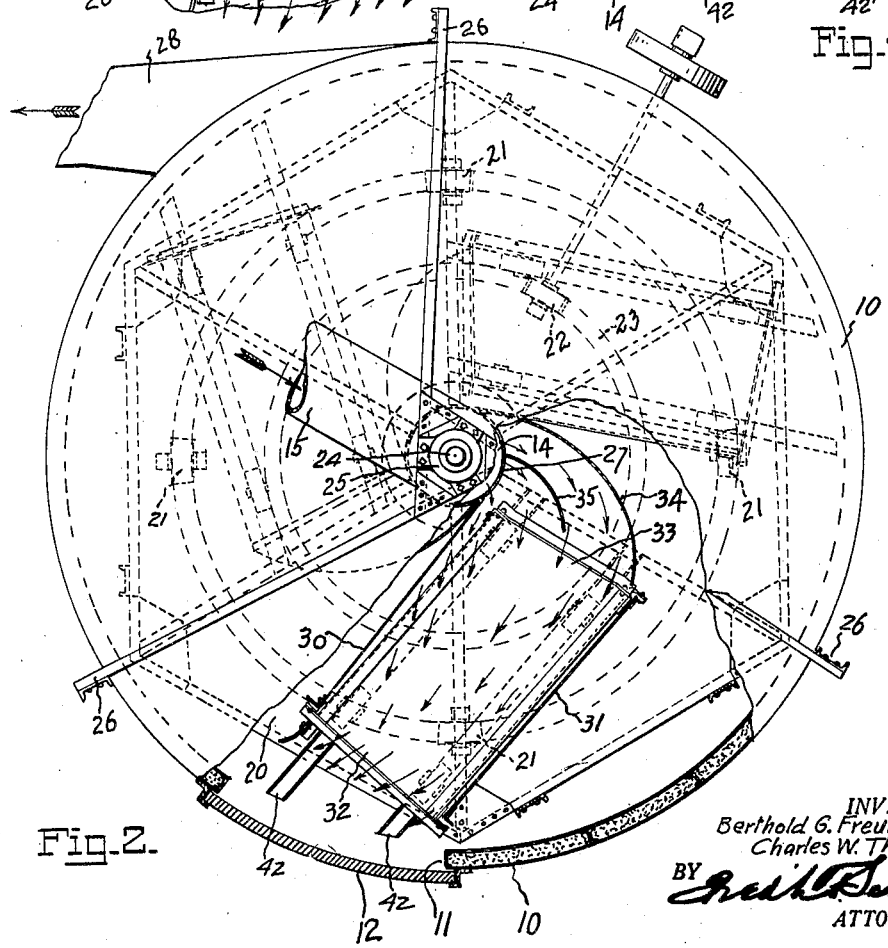
INVENTORS
Berthold G. Freund
Charles W. Thomas
ATTORNEY Patented Sept. 19, 1933

1,927,396

UNITED STATES PATENT OFFICE 1,927,396

DEHYDRATING APPARATUS

Berthold G. Freund, New York, N. Y., and Charles W. Thomas, Tenafly, N. J., assignors, by direct and mesne assignments, of thirty-five one-hundredths to said Freund, and forty-five one-hundredths to said Thomas, and twenty one-hundredths to Norbert Lyons, Mount Vernon, N. Y.

Application March 16, 1932. Serial No. 599,096

12 Claims. (Cl. 34—28)

The invention relates to dehydrating apparatus such as is employed in the desiccation of vegetables, fruits, and the like, and other food products. In an apparatus of this nature the material is usually supported upon suitable trays or racks which may be mounted upon suitable trucks to be moved into or through a chamber wherein the material is exposed to a gaseous desiccating medium drawn through the said chamber.

Generally, the present invention contemplates a similar arrangement, and it has for an object the provision of individual drying compartments arranged for rotation within a sealed casing into which is introduced a gaseous desiccating medium, the same being withdrawn therefrom after having been directed through the various compartments. The arrangement of the individual compartments is such that said medium may be more uniformly and satisfactorily distributed as a powerful draft through the individual compartments and whereby a rapid and effective drying of the material is attained, while the rotation effects a centrifugal action upon the moisture to accelerate its separation from the material.

A further object of the invention resides in the provision of novel rack members for the material and adapted to support trays within the compartments in such a manner that the drying medium is compelled to pass substantially through the material carried thereon as well as over and under the same as heretofore, thereby serving to carry off rapidly its moisture to the extent desired.

In carrying out the invention, a suitably shaped casing is provided, the same being closed at the top but having an axial inlet thereat for a gaseous desiccating medium, said casing being provided also with a peripheral outlet through which the spent medium is drawn off.

A platform is rotatably mounted at the lower portion of the casing and carries an axial duct adapted to receive at its upper end the incoming desiccating medium which is to be distributed therefrom, for example, through longitudinal openings in the wall of the duct.

The said platform carries a plurality of drying compartments which are disposed within the casing and preferably substantially tangential to the said duct for better distribution of the drying medium, and the same are rotatable with the said platform. The compartments, furthermore, are open at their opposite ends; and at their respective inner ends each compartment communicates with the axial duct to receive therefrom the desiccating medium, the same being eventually discharged from the opposite end of a compartment.

Vertically disposed and curved plates are located to this end between the casing top and platform, to rotate with the latter, and afford partitions extending between the said duct and one edge of the inner end of a compartment to deflect the gaseous desiccating medium discharged from the said duct into a compartment through its inner end, the other inner edge of a compartment contacting with the duct wall.

Suitable tracks are provided along the platform and extend longitudinally through the respective compartments for delivering thereinto a truck or the like, which may be rolled within the casing. These trucks are designed to support suitable racks with drying trays stacked one above the other and adapted to retain the material to be desiccated. The construction of a rack is such, moreover, that the trays supported thereon are tilted both in a vertical plane and in a horizontal plane.

By this expedient, the desiccating medium which is forced through a compartment is also obliged to pass to a large extent through the material scattered over the trays rather than merely passing over and under the material upon a tray.

The nature of the invention, however, will best be understood when described in connection with the accompanying drawings, in which:

Fig. 2 is a plan thereof, with portion of the top broken away to disclose the interior, and a part horizontal section at the broken-away portion.

Fig. 3 is a fragmentary detail horizontal section, on an enlarged scale, illustrating a rack-receiving compartment and the means for delivering a gaseous desiccating medium thereto, the arrows indicating the direction of flow of the medium therethrough.

Fig. 4 is a fragmentary vertical section thereof taken on the line 4—4, Fig. 3, and looking in the direction of the arrows.

Fig. 7 is a side elevation thereof.

Figure 5:
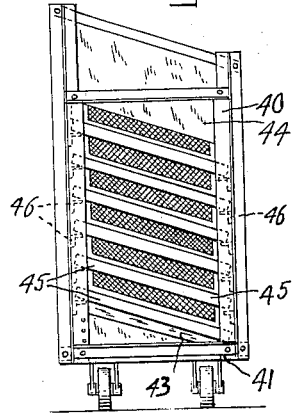
Figs. 5 and 6 are respectively a rear and front elevation of a truck and rack with trays for retaining the material to be desiccated.

Referring to the drawings, 10 designates a suitably shaped closed casing, in the present instance cylindrical, and provided with a vertically disposed opening 11 adapted to be closed by a door 12 when the apparatus is in operation and serving to admit and discharge the drying racks, as hereinafter more fully set forth. The casing is closed at the top which is provided with an axial opening 13 through which passes an axially disposed distributing duct 14 registering with a supply pipe 15 for furnishing the heated gaseous desiccating medium to the apparatus.

Provision is made for rotating within the casing the material to be desiccated, and to this end a horizontally disposed platform 20 is located in the lower portion of the casing 10, the same being supported upon rollers 21 and driven from a pinion 22 in engagement with a circular rack 23 secured to the underside of the platform. The distributing duct 14 is secured to this platform to be rotatable therewith; and the platform as a whole is guided in its rotation through a spindle 24 extending upwardly therefrom and passing axially through the duct 14 and mounted in a suitable axial bearing 25 secured in a frame 26 supported over the top of the casing.

Platform 20 may thus be rotated within the sealed casing 10, while a gaseous desiccating medium is supplied into the casing from the distributing duct 14 as through longitudinal openings 27 therein, and an outlet duct 28 from the casing discharges the spent gaseous medium therefrom.

However, this distribution of the desiccating medium is not directly into the casing, but through a plurality of drying compartments formed by the side walls 30 and 31, respectively, the compartments being open at their respective front and rear ends 32 and 33. These compartments are directed substantially tangentially to the duct 14; and, as shown, the one wall 30 of a compartment extends inwardly to the said duct and is secured thereto. The inner end of the other wall 31, furthermore, is connected by a vertical partition 34 also to the said duct, the partition 34, moreover, being curved to direct desiccating medium from an outlet 27 into the rear portion of a compartment as through the open end 33 thereof and a baffle 35 being provided for more uniform distribution. A top plate 36 extends forwardly over the partition and baffle to the opening 33 and together with an upstanding rear plate 37 therefrom serves to prevent the gaseous medium from flowing over the top of a truck when in position within a compartment; and similarly a bottom plate 38 is provided which is displaced somewhat from the platform.

Figure 6:
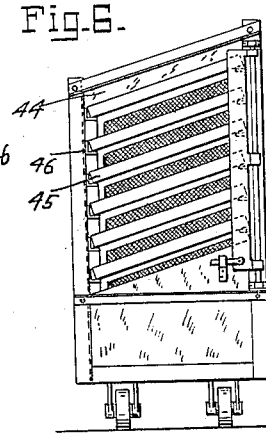
Figure 1:
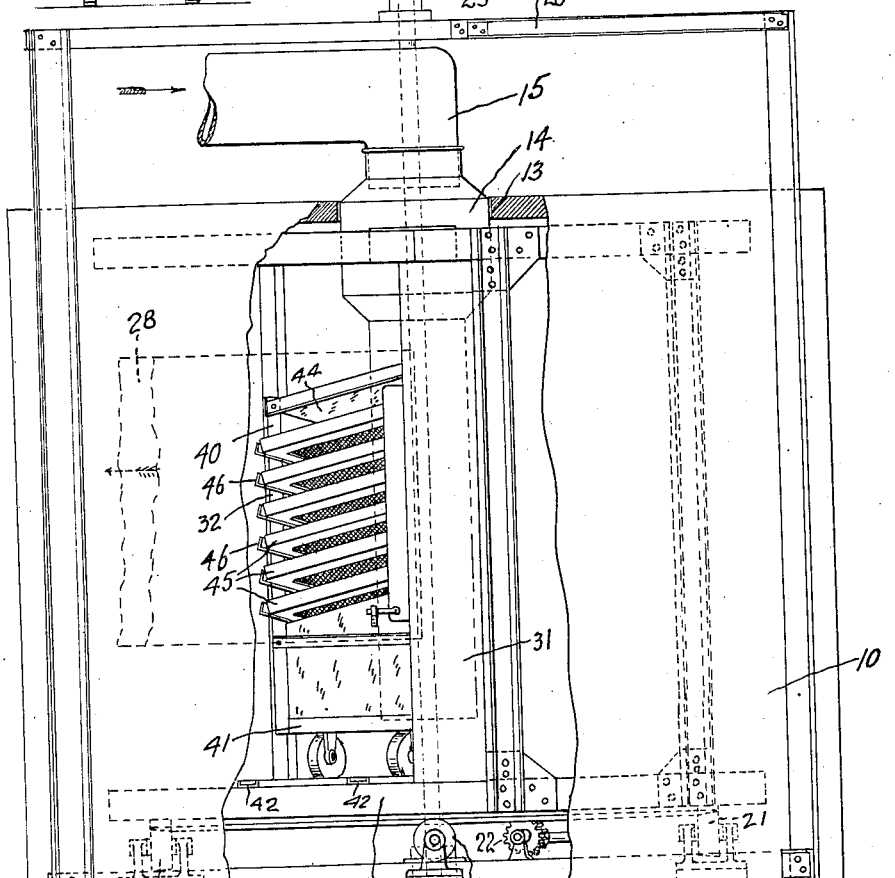
Fig. 1 is a front elevation of the dehydrating apparatus, with a portion of the casing wall broken away to disclose the interior.

A plurality of these compartments is thus distributed over the rotatable platform 20, each compartment individually receiving a supply of gaseous desiccating medium through its inner end. There is arranged, furthermore, to be located within each compartment a suitable open frame rack member 40 which may, if desired, be mounted upon a wheeled truck 41, a compartment and adjacent portion of the platform 20 then being provided with suitable tracks 42 to receive a truck for charging the compartment and also for allowing of a ready withdrawal of the truck therefrom. As is shown more particularly in Figs. 5–7, these racks comprise a suitable framing having a closed bottom plate 43 which is inclined upwardly and both in a vertical and horizontal plane, the lower edge of a plate 43 extending to the bottom of the rack and the plate serving to deflect gaseous desiccating medium upwardly when a truck is introduced into a compartment and with the inner edge of a plate 43 juxtaposed to the corresponding edge of a plate 38 and the inner end of a top plate 44 of the rack located beneath the plate 36. The rack, moreover, is designed to stack above the plate 43 a plurality of drying trays 45 of foraminous material and which trays follow substantially the inclination of the plate 43, being located on suitable lateral supports 46 arranged substantially parallel to the said plate.

By thus inclining the various trays and causing the desiccating medium to be directed thereto above the bottom plate 43 and through the one side of the rack frame, the medium is caused to flow more or less through the material retained upon the drying trays rather than merely above and below the same as is the case in the usual arrangement of drying trays in a desiccating chamber.

A much more effective and rapid drying of the material is thereby attained, the drying action being further enhanced through the centrifugal action upon the contained moisture due to the rotation of these drying trays with their respective compartments. When the drying action has proceeded to the desired extent, the door 12 of the casing may be raised and a compartment arranged to register therewith so that its truck may be withdrawn over the tracks 42 and replaced by a truck carrying a fresh supply of material for desiccation.

We claim:

1. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, and drying racks adapted to fit within the compartments.

2. Dehydrating apparatus, comprising a closed casing provided with a feed opening, and means to close the same, means to supply a gaseous desiccating medium axially to the casing, and an outlet from the casing for spent medium, a rotatable platform at the bottom of the casing, a gaseous medium distributing duct axially carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, and drying racks adapted to fit within the compartments.

3. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing and angularly disposed thereon substantially tangential to the said distributing duct and with their inner ends in communication with the respective longitudinal outlets of the distributing duct, the said compartments being open at their opposite ends, and drying racks adapted to fit within the compartments.

4. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing, said compartments being open at their opposite ends with the inner ends communicating with the respective longitudinal outlets of the distributing duct and the opposite ends discharging into the casing, and drying racks adapted to fit within the compartments.

5. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of open-ended drying compartments carried by the platform within the casing, and curved vertical partitions rotating with the platform and extending between a duct outlet and one of the inner edges of a compartment to deflect gaseous medium from the said duct into the compartment through its inner end, the outer end of a compartment discharging into the casing, and drying racks adapted to fit within the compartments.

6. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, tracks provided over the platform and into the respective compartments, and a truck with drying rack carried thereby adapted to ride over the tracks and fit within a compartment.

7. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, tracks provided over the platform and into the respective compartments, a truck with drying rack carried thereby adapted to ride over the tracks and fit within a compartment, and the rack being displaced thereby from one of the side walls of the compartment to receive a lateral supply of the gaseous medium.

8. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, drying racks adapted to fit within the compartments, and an inclined wall closing the bottom of a rack and adapted to deflect the incoming gaseous medium upwardly therethrough.

9. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, drying racks adapted to fit within the compartments, and a wall inclined both with respect to a vertical and to a horizontal plane, closing the bottom of a rack and adapted to deflect the incoming gaseous medium upwardly therethrough.

10. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, drying racks adapted to fit within the compartments, a wall inclined both with respect to a vertical and to a horizontal plane, closing the bottom of a rack and adapted to deflect the incoming gaseous medium upwardly therethrough, and trays stacked in a rack substantially parallel to the said wall.

11. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, drying racks adapted to fit within the compartments, a wall inclined both with respect to a vertical and to a horizontal plane, closing the bottom of a rack and adapted to deflect the incoming gaseous medium upwardly therethrough, and means to direct the gaseous medium above said plate.

12. Dehydrating apparatus, comprising a closed casing provided with a feed opening, and means to close the same, means to supply a gaseous desiccating medium to the casing, and an outlet from the casing for spent medium, a rotatable platform within the casing, a gaseous medium distributing duct carried by and rotatable with the platform for receiving the gaseous desiccating medium and having a plurality of longitudinal outlets, a plurality of drying compartments carried by the platform within the casing with their inner ends in communication with the respective longitudinal outlets of the distributing duct, the said compartments being open at their opposite ends, tracks provided over the platform and into the respective compartments, a truck with drying rack carried thereby adapted to ride over the tracks and fit within a compartment, a wall inclined both with respect to a vertical and to a horizontal plane, closing the bottom of the rack and adapted to deflect the incoming gaseous medium upwardly therethrough, and means to direct the gaseous medium above said plate.

CHARLES W. THOMAS.
BERTHOLD G. FREUND.